(12) United States Patent
Fan et al.

(10) Patent No.: US 8,266,478 B2
(45) Date of Patent: Sep. 11, 2012

(54) SYSTEM AND METHOD TO MANAGE PROBLEMS WITH NETWORK-BASED SERVICES

(75) Inventors: James Fan, San Ramon, CA (US); Jennifer K. Lam, Fremont, CA (US)

(73) Assignee: AT&T Intellectual Property I, LP, Reno, NV (US)

( * ) Notice: Subject to any disclaimer, the term of this patent is extended or adjusted under 35 U.S.C. 154(b) by 237 days.

(21) Appl. No.: 12/566,409

(22) Filed: Sep. 24, 2009

(65) Prior Publication Data

US 2011/0072312 A1    Mar. 24, 2011

(51) Int. Cl.
   *G06F 11/00*    (2006.01)
(52) U.S. Cl. .......................................................... 714/26
(58) Field of Classification Search ............... 714/26, 714/27
   See application file for complete search history.

(56) References Cited

U.S. PATENT DOCUMENTS

| | | | | |
|---|---|---|---|---|
| 5,666,481 | A * | 9/1997 | Lewis | 714/4.2 |
| 6,278,375 | B1 | 8/2001 | Hucker | |
| 6,883,119 | B1 * | 4/2005 | Bette et al. | 714/43 |
| 7,043,659 | B1 * | 5/2006 | Klein et al. | 714/4.4 |
| 7,257,514 | B2 * | 8/2007 | Faihe | 702/183 |
| 7,259,666 | B1 * | 8/2007 | Hermsmeyer et al. | 340/517 |
| 7,266,734 | B2 * | 9/2007 | Chavez et al. | 714/48 |
| 7,305,466 | B1 * | 12/2007 | Kaffine et al. | 709/224 |
| 7,325,170 | B2 * | 1/2008 | Srinivasan et al. | 714/46 |
| 7,349,889 | B1 * | 3/2008 | Alling et al. | 706/46 |
| 7,426,654 | B2 * | 9/2008 | Adams et al. | 714/4.3 |
| 7,681,080 | B2 * | 3/2010 | Abali et al. | 714/27 |
| 7,836,092 | B2 * | 11/2010 | Alaniz et al. | 707/802 |
| 2003/0110248 | A1 * | 6/2003 | Ritche | 709/224 |
| 2003/0121036 | A1 | 6/2003 | Lock et al. | |
| 2007/0004377 | A1 | 1/2007 | Medford et al. | |
| 2007/0136743 | A1 | 6/2007 | Hasek et al. | |

* cited by examiner

*Primary Examiner* — Bryce Bonzo
(74) *Attorney, Agent, or Firm* — Larson Newman, LLP

(57) ABSTRACT

A problem management system can include a system architecture having a first horizontal layer including a plurality of access interfaces, each access interface adapted to receive a problem report from a customer. The problem report indicates that the customer is having a problem with a network-based service of a plurality of network-based services. The architecture also includes a task management domain at the first horizontal layer adapted to obtain a workflow, a problem resolution rule, or any combination thereof, from a second horizontal layer of the problem management system, and provide a diagnostic tool, troubleshooting information, or any combination thereof, via the access interface. The architecture also includes an agent support platform to provide the diagnostic tool, troubleshooting information, a trouble report associated with the customer, a problem history associated with the customer, or any combination thereof, to an agent via another access interface after the customer contacts the agent.

20 Claims, 4 Drawing Sheets

SYSTEM AND METHOD TO MANAGE PROBLEMS WITH NETWORK-BASED SERVICES

FIELD OF THE DISCLOSURE

The present disclosure generally relates to communications networks, and more particularly relates to managing problems with network-based services.

BACKGROUND

Service providers are able to provide a broad array of network-based services that include video, telephone, cellular, data and other services. Such services require extensive network infrastructure and customer premises equipment, which increases the vulnerability of such services to outages and other disruptions. Most customers are not sophisticated in network technologies or equipment and, therefore, rely on service providers for troubleshooting and repair of network-based services.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

In this specification, a system architecture to manage a problem with a network-based service is disclosed. The architecture is disclosed with reference to a series of layers and various domains within each layer. In a particular embodiment, aspects of the architecture (other than, for example, customer homes, network infrastructure, CPE devices and the like) can be implemented at a server or other computing device, and various layers and domains can represent software logic, hardware logic, or any combination thereof, at the computing device. In another embodiment, the architecture can be distributed among multiple systems, such that each layer and each domain can represent a computing device, software or hardware logic at a computing device, a database, or any combination thereof. For example, a layer can represent a server or group of servers, and a domain can represent software logic or a data store at the server or group of servers. Those skilled in the art will recognize that various layers and domains of the architecture can be implemented using various combinations of computing devices, software and hardware logic.

Figure 1:
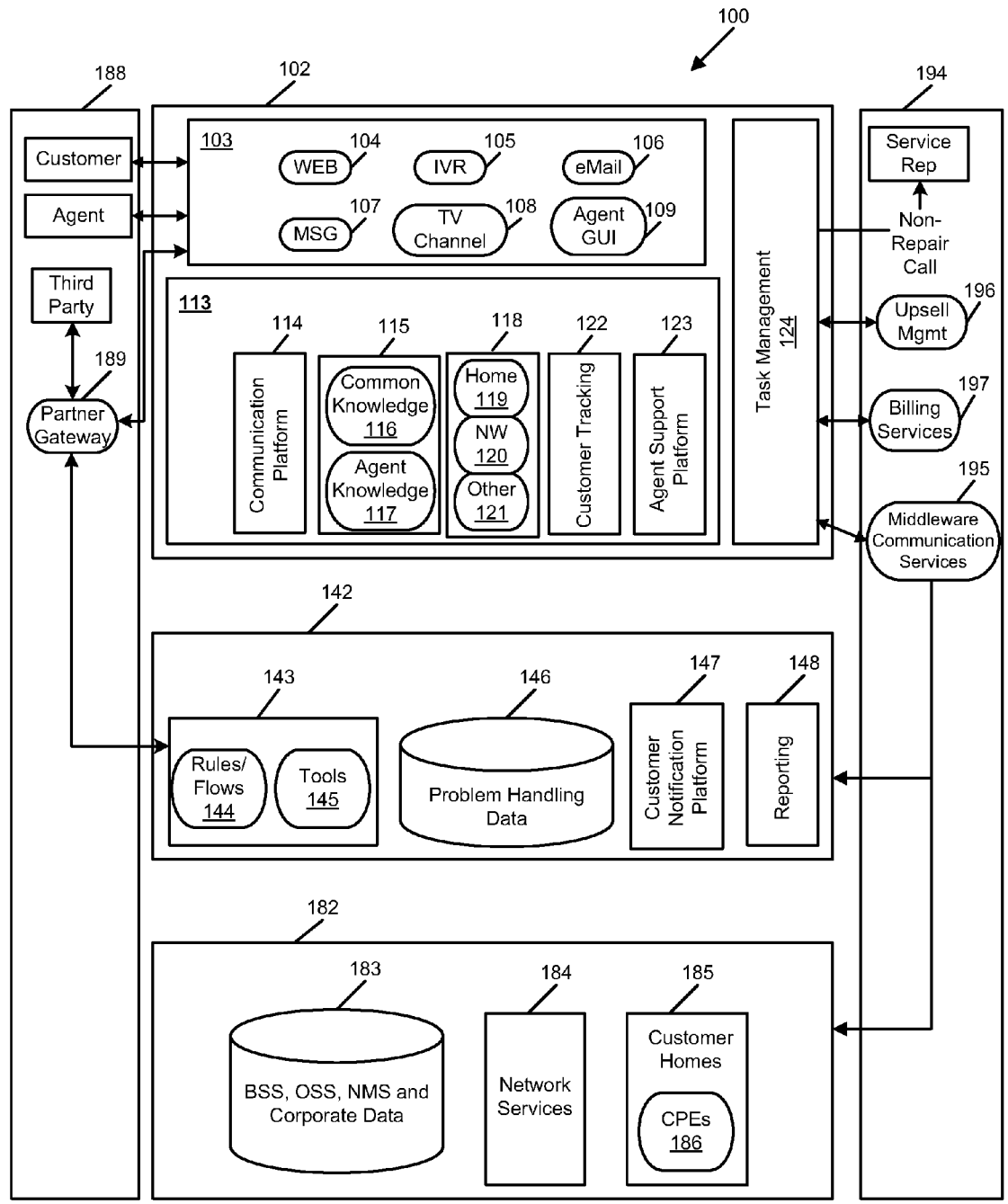
FIG. 1 is a block diagram illustrating a particular embodiment of a system to manage a problem with a network-based service.

FIG. 1 illustrates a particular embodiment of a system 100 to manage a problem with a network-based service. The system 100 can include a plurality of layers. For example, the system 100 can include a first horizontal layer 102, a second horizontal layer 142 and a third horizontal layer 182. Additionally, the system 100 can include a first vertical layer 188 that facilitates communications from user entities (such as a customer, an agent, another user, or any combination thereof) to the first layer 102. The first vertical layer 188 can also facilitate communications from a third party, such as an external service provider partner, to the second horizontal layer 142 via a partner gateway 189. The system 100 also includes a second vertical layer 194 that facilitates communication among first horizontal layer 102, the second layer 142 and the third horizontal layer 182.

In a particular embodiment, the first horizontal layer 102 can include an access infrastructure 103 that includes a plurality of access interfaces 104-109 that are adapted to provide a customer, an agent or any combination thereof, with interactive access to report a problem with a network-based service, receive problem repair information from the various layers of the system 100, or a combination thereof. For instance, the access infrastructure can include a web interface 104, such as a problem troubleshooting website, a customer-agent chat forum, or other web interface; an interactive voice response system 105; an e-mail interface 106 to allow a customer to send an e-mail to an agent at the system 100, receive an e-mail from an agent at the system 100, or any combination thereof; a messaging interface 107 to allow a customer to send a mobile Internet messaging (MIM), short messaging service (SMS) message or other message to an agent at the system 100, to receive an MIM, SMS or other message from an agent at the system 100, or any combination thereof; an interactive customer self-care television channel 108 accessible via a set-top box device or other customer premises equipment via a private Internet Protocol Television (IPTV) access network; a graphical user interface (GUI) 109, such as a thin client GUI or other GUI delivered to an agent terminal or desktop; or any combination of such access interfaces.

The first horizontal layer 102 can also include a problem resolution domain 113. The problem resolution domain 113 can include an agent-customer communication platform 114 that provides infrastructure to support communications between an agent and a customer. For instance, the agent-customer communication platform 114 can include a phone network, a local area network, a wide area network, another communication infrastructure, or any combination thereof, to transmit data from one or more of the access interfaces 104-108 to an agent computing device, phone, or combination thereof.

Further, the first horizontal layer 102 can include a knowledge management domain 115 to store information to help customers and agents to find information related to problems with network-based services. For instance, the knowledge management domain 115 can include a common knowledge data store 116 to store content related to problems previously reported by customers and how such problems were solved, such as an agent that resolved the problem, a solution to the problem, a location of information needed or used to resolve the problem, other historical information related to the problem, or any combination thereof. In another example, the common knowledge data store can store a video demo or other pre-made training facility that a customer or agent can access for self-learning purposes.

The knowledge management domain 115 can also include an agent knowledge data store 117 to store data indicating problems previously solved by particular agents and how the particular agent resolved the problem. In an example, each agent can access data only associated with that agent at the agent knowledge data store 117, rather than reviewing or searching through all data at the common knowledge data store 116. Thus, if an agent recalls that a similar problem was resolved by the agent on a particular date, the agent can access a record from that date that is associated with the agent, rather than searching generally for the type of problem, for instance, in the common knowledge data store 116.

The problem resolution domain 113 can also include a common tools domain 118 that stores pre-developed home diagnostic tools 119 to assist customers and agents with basic troubleshooting of network-based services t customer premises. The home diagnostic tools 119 can be invoked via the access interfaces 104-109, can be loaded to customer premises equipment (CPE) to assist trouble shooting or self-healing, or any combination thereof. The common tools domain 118 can also store network diagnostic tools 120 that monitor network infrastructure and attempt to diagnose outages and other problems without customer reporting, such that problems may potentially be fixed before customers experience disruptions or soon thereafter. The common tools domain 118 can also include other diagnostic tools 121 to diagnose service problems, network problems, other problems, or any combination thereof.

The problem resolution domain 113 can also include a customer tracking domain 122 that stores data associated with a particular customer and problems encountered by the customer with respect to network-based services provided by the service provider. For example, the customer tracking domain 122 can store data describing a lifecycle of a trouble report made by the customer. The data can be updated in real-time or when a particular event associated with a reported problem occurs. Examples of such events can include an attempt at self-healing by a CPE device, an initial report of a problem by the customer, use of a self-service tool by the customer, assignment to an agent, communication with an agent, a report that the problem has been solved, a closing of the trouble report, another event. In a particular embodiment, the data can be accessed by an agent to determine, for instance, what actions have has already been taken or attempted in the course of solving a customer problem. Additionally, data related to past trouble reports by the customer can be accessed to determine whether a particular problem was previously addressed for the customer and what solution, if any, was applied.

In a non-limiting embodiment, the problem resolution domain 113 can also include an agent support platform 123 that supplies support functions for an agent thin GUI in the access & presentation layer. For instance, the agent support platform 123 can provide data caching functions, provide toolbars having frequently invoked functions of the GUI, store performance indicators for an agent indicating how quickly the agent is solving customer problems of various types, organize agents by layers of training or capabilities, or provide other functions related to agents.

The first horizontal layer 102 can also include a task management domain 124. In an illustrative embodiment, the task management domain 124 can include a sub-vertical layer within the first horizontal layer 102. The task management domain 124 can reach out to aspects of the system 100 that are outside the first horizontal layer 102 to obtain information that may be inaccessible to agents or other aspects of the system 100 directly. For example, the task management domain 124 can obtain information from the Business Support Systems, Operations Support Systems, Network Management Systems (BSS, OSS, NMS) & Corporate Data domain 183, the customer tracking domain 122, another aspect of the system 100, or any combination thereof, indicating a customer profile, subscribed services, CPE device information for the customer, trouble history, products available for upsell to the customer, other customer information, or any combination thereof.

In addition, the task management domain 124 can provide other functions related to addressing customer problems. For example, the task management domain 124 can receive network outage information (such as from the network diagnostics tools 120) and provide outage information to customer inquiries for customers in a region affected by the outage, allow customers reporting problems not related to the outage to interact with the problem resolution domain 113, or a combination thereof. In another example, the task management domain 124 can provide a rules engine to access troubleshooting and problem resolution flows and provide information related to such flows to the access interfaces 104-109 in response to a reported problem.

The second horizontal layer 142 of the system 100 can include a repair services data store 143 that can store workflows, rules or any combination thereof ("flows/rules") 144, such as problem resolution flows, home diagnostic flows, network diagnostic flows, or any combination thereof. Such flows/rules 144 can include intelligent rules to take sequences of actions with respect to diagnosing and resolving particular service problems across a self-healing stage, a customer self-service stage, an agent interaction stage, or any combination thereof, of a problem resolution process.

In addition, the repair services data store 143 can store diagnostic and repair tools 145 that are provided to access interfaces 104-109 during problem resolution, such as tools provided via the common tools domain 118, other CPE diagnostic tools, customer self-service diagnostic tools, network diagnostic tools, or any combination thereof. In a particular embodiment, the repair services data store 143 can have direct access to mission critical network services, such as OSS/NMS, or even to a network and CPE devices. Thus, it can provide repair flows and tools to upstream domains while preventing such domains from accessing the mission critical OSS/NMS or network directly.

The second horizontal layer 142 can also include a problem handling data domain 146 that stores customer problem and repair records, including complete problem resolution cases, problem histories related to a network, problem histories related to a service, customer contact logs, problem outcomes, other customer problem and repair records, or any combination thereof. In one embodiment, the problem handling data domain 146 can store information related to customer problem and repair records in aggregate form, without reference to individual customers. Thus, unlike the customer tracking domain 122, an agent can access information related to a problem that a particular customer is experiencing for the first time, but that other customers have experienced previously.

The second horizontal layer 142 can also include a customer notification platform 147 that stores event notification preferences of particular customers. For example, a customer may register to be notified of an Internet outage, a status of a reported problem, another event, or any combination thereof. The customer notification platform 147 can also store information related to communication methods by which a customer prefers to be contacted (such as phone, text, e-mail, TV channel). Such communication preferences can vary for a customer by time of day.

The second horizontal layer 142 can also include a reporting domain 148 that compiles reports related to problem trends, alerts, service and network performance indicators, agent performance indicators, other information, or any combination thereof. The reporting domain 148 can obtain information from other aspects of the system 100, sort the data, format the data, organize the data into statistics or other useful forms, output the data to service provider personnel, or any combination thereof.

The third horizontal layer 182 can include a BSS, OSS, NMS & Corporate Data domain 183 that provides primarily automated testing and resolution services such as network monitoring, outage notification, network trouble ticketing, and testing for network services 184 and the customer home domain 185. The BSS, OSS, NMS & Corporate Data domain 183 can also provide corporate data access via middleware connections (such as the middleware communication services 195) to the task management domain 124. In a particular embodiment, BSS & OSS components in the BSS, OSS, NMS & Corporate Data domain 183 can supply customer subscription data to the task management domain 124.

The network services 184 can include, for example, wireline network infrastructure, wireless network infrastructure, IP network infrastructure, other network infrastructure, or any combination thereof, as well as facilities (such as CPE management facilities and failover or outage management facilities) to enable various services to run on top of the infrastructure. The customer home domain 185 that can include CPEs 186 at customer homes, which are either loaded with or able to download service provider firmware and software to perform self-healing functions.

The first vertical layer 188 can facilitate communication between the first horizontal layer 102 and the second horizontal layer 142. The first vertical layer 188 can allow a customer, an agent, service provider technical personnel, a third party partner, or any combination thereof, to access information at the second horizontal layer 142, such as flows/rules 144, tools 145, problem handling data 146, other information or any combination thereof. In a particular embodiment, the first vertical layer 188 can include a partner gateway 189 or other gateway that allows parties that are not customers or affiliates of the service provider, such as third party providers of problem handling tools, to access information at the repair services data store 143.

The second vertical layer 194 can enable the task management domain 124 to access the BSS, OSS, NMS and corporate data domain 183 at the third horizontal tier 182. In a particular embodiment, the middleware communication services domain 195 can enable the task management domain 124 to communicate with any other domain, layer, or any combination thereof in the system 100. In this embodiment, the task management domain 124 can communicate with domains at the first layer 102 directly or via the middleware communication services domain 195. The second vertical layer 194 can also include an upsell management domain 196 and a billing services domain 197 to allow service personnel, agents, or a combination thereof, to invoke API services or to launch context to gain access to ordering, sales, billing and other information for purposes of upselling and without building duplicate features inside various components of the system 100.

In a particular illustrative embodiment, the network services 184 can include an element management system (not shown), for example, that can consistently monitor the network infrastructure. If a problem is detected, data indicating the problem can be sent from the element management system to an NMS component at the BSS, OSS, NMS and Corporate data domain 183, which can relay outage or other problem information to the customer notification platform 147. Customers that have registered to be notified of the problem or an associated problem type can be notified according to their notification preferences. In addition, data indicating the problem can be sent to, and stored at, the problem handling data domain 146, the common knowledge data store 116, another domain that stores network problem data, or any combination thereof. In addition, a stock response can be stored at the communication platform 114, the task management domain 124, the repair services data store 143 (such as with the flows/rules 144), or another domain, such that the stock response is accessible to the access interfaces 104-109.

A customer CPE 186 can detect a problem, such as a data or video content disruption, and can attempt to repair the problem automatically. For instance, the CPE 186 can execute a self-healing application stored at the CPE 186, can download the self-healing application from the network services 184 or home diagnostic tools 119, or any combination thereof. If the self-healing application is not effective to solve the problem, a customer may become aware of the problem and access the system 100 via an access interface, such as the TV channel 108. The customer can report the problem by interacting with the TV channel 108, for instance, by typing a description of the problem using a remote control keypad or by selecting the problem or a related problem type form a menu displayed via the TV channel 108. The problem report can be sent to the access infrastructure 103 via a private network, such as an IPTV access network. If the problem reported by the customer is of a type detected by the network services 184, then a stock response indicating that the service provider is aware of the problem and working to resolve it can be sent to the customer set-top box device and displayed via the TV channel 108.

On the other hand, if the problem is of a type that has not been detected, the task management domain 124 can communicate with the BSS, OSS, NMS and Corporate data store 183 via the second vertical layer 194 to verify a customer account, a customer identity, a customer subscription to a problem resolution service associated with the system 100, a service included in the customer account, other information, or any combination thereof. After the customer information is verified, a trouble report can be created at the customer tracking domain 122 that indicates the problem reported by the customer.

The task management domain 124 can obtain a workflow, rules, or any combination thereof from the flows/rules 144, and provide an interface to the customer that enables the customer to troubleshoot the problem. For instance, the customer can be prompted to input additional information about the problem or can be directed to the home diagnostic tools 119, the common knowledge data store 116, the problem handling data domain 117, another domain, or any combination thereof, to obtain information indicating how the customer can solve the problem. Data can be stored in association with the customer trouble report, which identifies information provided to the customer, a workflow associated with the problem, rules associated with the problem, whether the customer reported that the problem was solved, or any combination thereof.

If the customer is unable to resolve the reported problem, the customer may contact an agent via e-mail, web chat, phone, or any combination thereof, via the communication platform 114. Information indicating that the customer contacted an agent can be stored in association with the customer trouble report. In a particular embodiment, the information can identify a type of agent (such as particular agent tier of expertise). The agent can access the customer tracking domain 122 using the agent GUI 109 and review data indicating the reported problem and information already provided to the customer regarding the problem. The agent can also obtain data indicating a workflow associated with resolving the problem, rules associated with resolving the problem, or a combination thereof, via the task management domain 124. In addition, the agent can review a problem history associated with the customer at the customer tracking domain 122 to see if the customer has reported a similar type of problem in the past and how the problem was resolved. Further, the agent can access data at the common knowledge data store 116, the agent knowledge data store 117, the problem handling data domain 146, or any combination thereof, to determine if a similar problem has been solved for another customer and how the problem was resolved. Moreover, the agent can access the home diagnostic tools 119, the network diagnostic tools 120, other tools 121, or any combination thereof, to attempt to determine a resolution for the reported problem.

If the agent can determine how the problem is to be resolved, the agent can communicate the resolution to the customer, and data indicating that such information was communicated to the customer, data indicating whether the problem was resolved, or any combination thereof, can be stored in association with the customer trouble report. If the problem is resolved or it is determined that an agent cannot resolve the problem the trouble report can be closed and added to a customer problem history at the customer tracking domain 122. If an agent cannot resolve the problem, then a service representative can be scheduled for dispatch to the customer home via network services 184, or a dispatching system (not shown).

Figure 2:
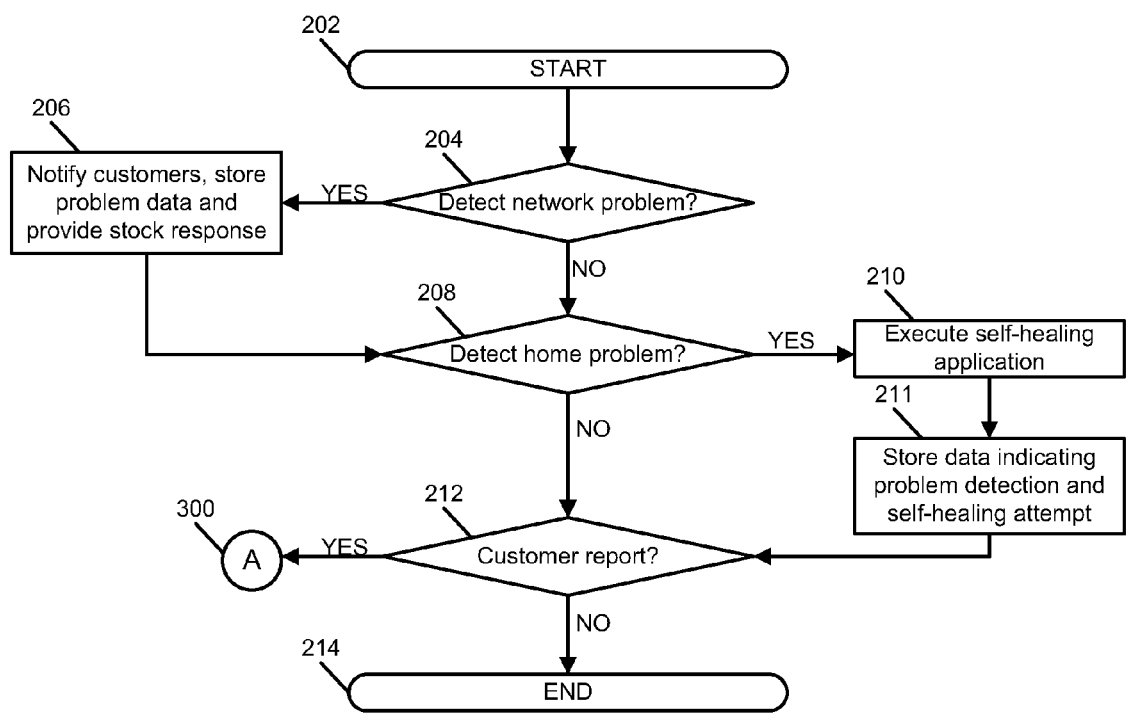
FIG. 2 is a flow diagram illustrating a particular embodiment of a method of managing a problem with a network-based service.

FIG. 2 illustrates a particular embodiment of a method of managing a problem with a network-based service. The method can start at 202. At decision node 204, a network diagnostic portion of a problem management system, such as the network services 184 or network diagnostic tools 120 of the system 100 illustrated in FIG. 1, can determine whether it has detected a network problem, such as an outage or disrupted portion of network infrastructure. If a problem is not detected, the method moves to decision node 208. If a network problem is detected, the method moves to block 206, and data indicating the problem can be sent to customers that have registered to be notified of the problem or an associated problem type. In addition, data indicating the problem can be sent to, and stored at a domain that stores network problem data, and a stock response can be made accessible to the access interfaces 104-109, such that customers reporting the problem will receive the stock response. The stock response can indicate, for example, that the problem has been detected and the service provider is working to resolve it.

At decision node 208, a CPE or other aspect of the problem management system can determine whether a problem has been detected at a customer home. If so, the method can move to block 210, and the CPE can execute a self-healing application. The self-healing application can be stored at the CPE, can be downloaded from the problem management system, or any combination thereof. In a particular embodiment, data can be stored at a customer tracking domain of the problem management system indicating that the CPE detected the problem and attempted self-healing.

Proceeding to decision node 212, it can be determined whether a customer has reported a problem at the problem management system. If so, the method can move to 300 and continue as described with reference to FIG. 3. Otherwise, the method can terminate at 214.

Figure 3:
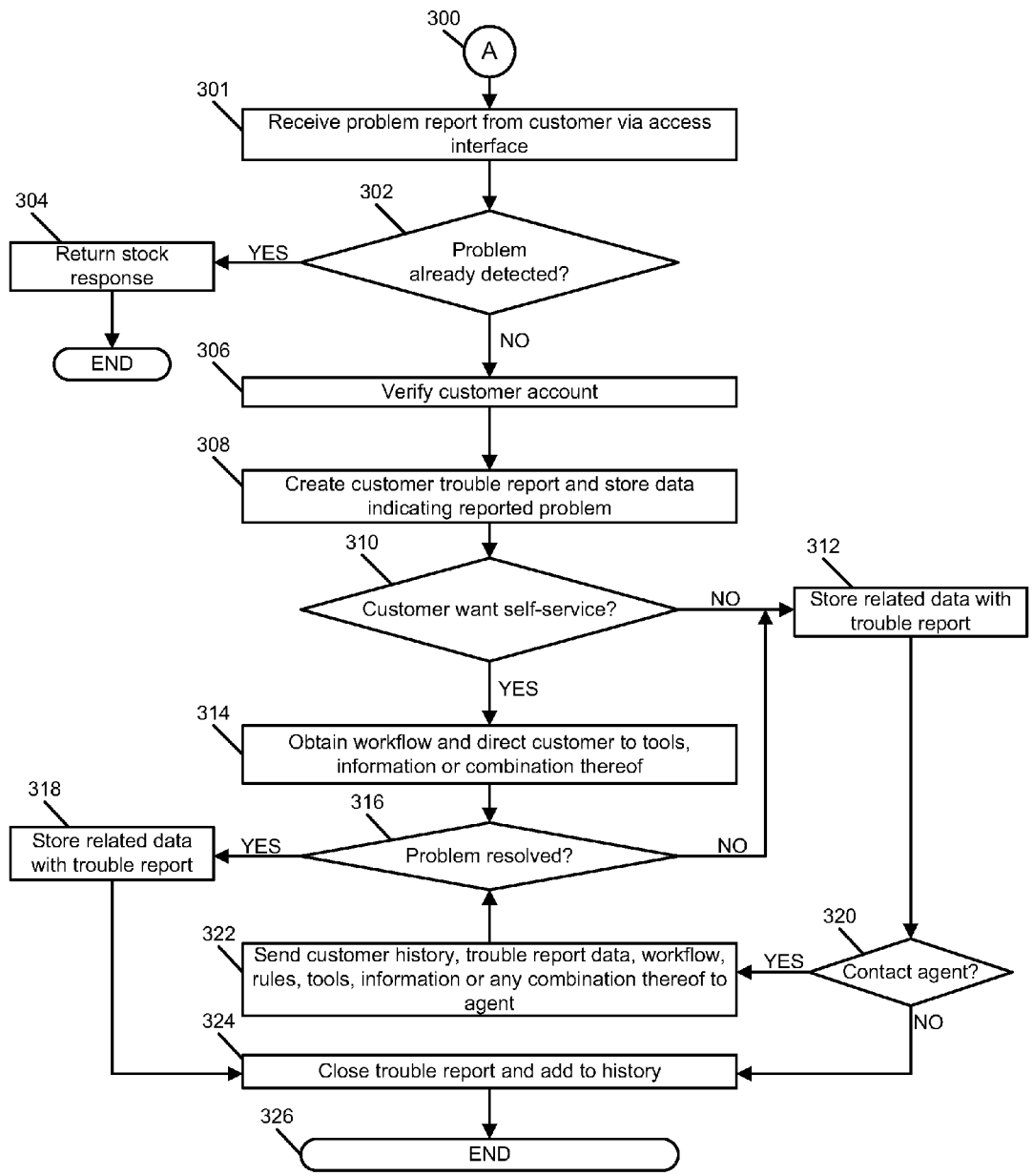
FIG. 3 is a flow diagram illustrating another particular embodiment of a method of managing a problem with a network-based service.

FIG. 3 illustrates another particular embodiment of a method of managing a problem with a network-based service. At 301, a problem report is received from a customer via an access interface of a problem management system, such as an access interface 104-109 of the system 100 illustrated in FIG. 1. Moving to decision node 302, a task management domain or other domain at the problem management system can determine whether the problem has already been detected. If so, the method can proceed to block 304, and the system can return a stock response via the access interface. The method can then terminate.

On the other hand, if the problem is of a type that has not been detected, the method proceeds to block 306, and the task management domain can verify a customer account, a customer identity, a customer subscription to a problem resolution service associated with the system, a service included in the customer account, other access information, or any combination thereof. Continuing to block 308, a trouble report associated with the customer can be created that indicates the problem reported by the customer.

Advancing to decision node 310, the task management domain or other domain at the problem management system can determine whether the customer has requested access to self-service facilities to attempt to resolve the reported problem. If not, the method can move to block 312, and related data (such as indicating that the customer declined self-service) can be stored in association with the customer's trouble report. The method can then proceed to decision node 320. Returning to decision node 310, if the customer has requested self-service, the task management domain can obtain a workflow, rules, or any combination thereof, and provide an interface to the customer that enables the customer to troubleshoot the problem using the tools, information, or any combination thereof, indicated by the workflow, rules or any combination thereof.

At decision node 316, the task management domain or other domain can determine whether the customer has reported that the problem is resolved. If so, the method can move to block 318, and the data indicating that the problem was resolved can be stored with the customer's trouble report. Data indicating how the problem was resolved can also be stored at a common knowledge domain or other domain. The method can proceed to block 324, and the trouble report can be closed and added to a problem history associated with the customer.

Returning to decision node 316, if the problem is not resolved through self-service, data indicating the same can be stored with the customer's trouble report at block 312, and the method can move to decision node 320. At decision node 320, it can be determined whether the customer has contacted an agent. If so, the method can proceed to block 322, and a customer history, trouble report data, workflow, rules, tools problem resolution information, or any combination thereof can be provided to the agent, for example, via a GUI operating at the agent's computing device.

In a particular embodiment, the method can return to decision node 316, and it can be determined whether the agent resolved the problem. If not, related data can be stored with the customer's trouble report. It can then be determined, at decision node 320, whether the customer has contacted another agent, such as an agent at a next tier of expertise. If so, the method can continue to block 322. If not, or if the first agent resolved the problem, the method can proceed to block 324, and the customer trouble report can be closed. The method can terminate at 326.

Figure 4:
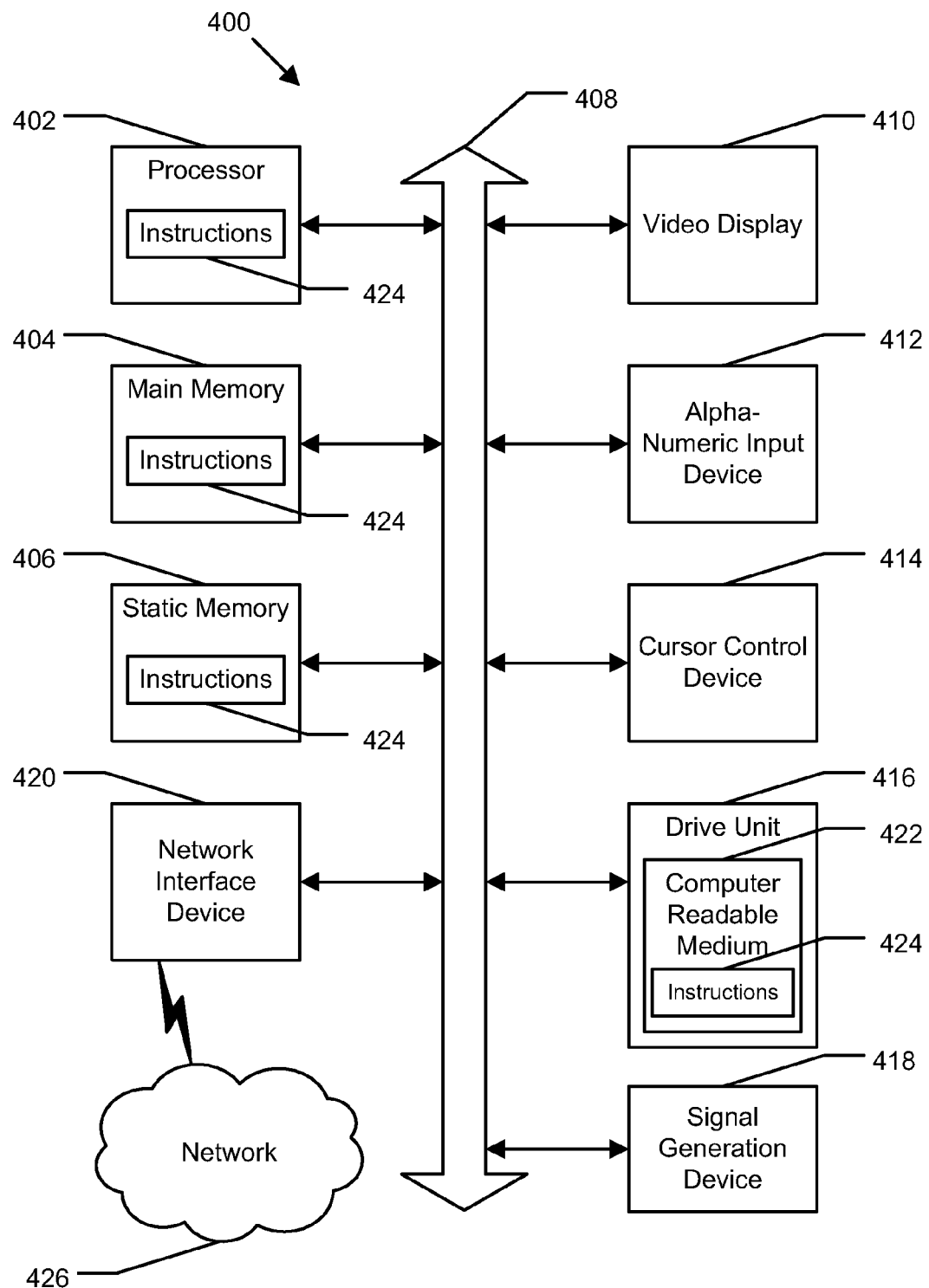
FIG. 4 is a block diagram illustrating a particular embodiment of a general computing system.

FIG. 4 shows an illustrative embodiment of a general computer 400 including a set of instructions that can be executed to cause the computer system to perform any one or more of the methods or computer based functions disclosed herein. The computer system 400 may operate as a standalone device or may be connected, such as using a network, to other computer systems or peripheral devices. In an illustrative embodiment, such standalone and peripheral devices can include, for example, servers, databases, other network elements, or any combination thereof, as illustrated in FIG. 1.

In a networked deployment, the computer system 400 may operate in the capacity of a server or as a client user computer in a server-client user network environment, or as a peer computer system in a peer-to-peer (or distributed) network environment. The computer system 400 can also be implemented as or incorporated into various devices, including, for instance, user devices adapted to send a service request, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

The computer system 400 may include a processor 402, such as a central processing unit (CPU), a graphics processing unit (GPU), or both. Moreover, the computer system 400 can include a main memory 404 and a static memory 406 that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse. The computer system 400 can also include a disk drive unit 416, a signal generation device 418, such as a speaker or remote control, and a network interface device 420.

In a particular embodiment as depicted in FIG. 4, the disk drive unit 416 may include a computer-readable medium 422 in which one or more sets of instructions 424, e.g. software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media. The network interface device 420 can provide connectivity to a network 426, such as a wide area network (WAN), a local area network (LAN), or other network.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 or receives and executes instructions 424 responsive to a propagated signal, so that a device connected to a network 426 can communicate voice, video or data over the network 426. Further, the instructions 424 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In conjunction with the embodiments disclosed herein, a system and method to manage problems with network-based services is provided. In a particular embodiment, the system can include a plurality of layers that directs communication and access among various domains of each layer. The system architecture can allow network-based service problems to be reported to a same architecture via multiple communication interfaces. In addition, multiple services can be supported by the same architecture, thereby leveraging knowledge already learned. For example, separate architectures need not be developed for IP services as opposed to IPTV service, phone services, or other services. The use of workflows, rules, problem resolution information, self-service, customer histories, trouble reports, other aspects, or any combination thereof, enable service centers, agents, and infrastructure for separate offerings to be merged.

In another particular embodiment, the system can integrate self-healing, self-service (customer interacting with service provider provided tools to perform diagnostic logic or using service provider provided self-help tools to resolve troubles) and agent-assisted processes to work in a single environment. The system can allow customers and agents to use similar or the same workflows, rules, information or a combination thereof. The system can also allow seamless contact context hand-over among different access interfaces and seamless routing to transition customer from doing self-service to agent assistance, for example, through maintaining updated trouble reports related to a customer's reported problem stored at a centralized domain. As a result, agent efficiency can be improved by reducing or eliminating redundancy in attempts to resolve a customer's problem using methods already attempted by the customer or a CPE.

In another particular embodiment, a vertical task management domain or other domain can facilitate tasks to ensure they are completed in particular sequences. This can enable orderly communications among horizontal layers. Additionally, when a reported problem needs to involve sophisticated network or CPE diagnosis, a repair services domain or other domain can act as a middleman to shield direct access of critical resources from other components or unauthorized personnel or customers.

Although the present specification describes components and functions that may be implemented in particular embodiments with reference to particular standards and protocols, the invention is not limited to such standards and protocols. For example, standards for Internet and other packet switched network transmission (such as TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

Many different aspects and embodiments are possible. Some of those aspects and embodiments are described below. After reading this specification, skilled artisans will appreciate that those aspects and embodiments are only illustrative and do not limit the scope of the present invention.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method of managing problems with network-based services, the method comprising:
    receiving a problem report from a customer via an access interface of a plurality of access interfaces at a first horizontal layer of a problem management system, wherein the problem report indicates that the customer is having a problem with one of the network-based services;
    receiving a request from the customer for self-service problem resolution via the access interface;
    identifying a workflow related to the problem;
    obtaining the workflow from a second layer of the problem management system;
    providing a diagnostic tool to the customer via the access interface, according to the workflow; and
    providing at least one of the diagnostic tool, a trouble report associated with the customer, and a problem history associated with the customer to an agent via another access interface after the customer contacts the agent.

2. The method of claim 1, further comprising:
    detecting a network problem prior to receiving the problem report from the customer;
    creating a response related to the network problem; and
    providing the response to the customer via the access interface when the problem report includes a problem related to the network problem.

3. The method of claim 1, further comprising verifying a customer account before providing the diagnostic tool to the customer.

4. The method of claim 1, further comprising creating a customer trouble report and storing data indicating that the customer has reported the problem with the network-based service.

5. The method of claim 4, further comprising storing additional data with the trouble report after providing a diagnostic tool to the customer, the additional data indicating the diagnostic tool was provided to the customer.

6. The method of claim 5, further comprising, when the problem is resolved based on the diagnostic tool, storing data indicating how the problem was resolved in at least one of a common knowledge data store, a problem handling domain, and a customer tracing domain.

7. The method of claim 5, further comprising storing further data with the trouble report after the customer contacts the agent, the further data indicating that the customer has contacted an agent.

8. The method of claim 7, further comprising providing the trouble report to the agent after the customer contacts the agent.

9. The method of claim 7, further comprising, when the problem is resolved by the agent, storing data indicating how the problem was resolved in at least one of a common knowledge data store, a problem handling domain, a customer tracing domain, and an agent knowledge data store.

10. The method of claim 1, further comprising providing a self-healing application to a customer premises equipment device after the customer premises equipment device detects the problem.

11. The method of claim 10, wherein the problem report is received from the customer after the customer premises equipment attempts to resolve the problem using the self-healing application.

12. The method of claim 11, further comprising storing information at the problem management system indicating that the customer premises equipment attempt to resolve the problem using the self-healing application, where the information is accessible to the agent after the customer contacts the agent.

13. A problem management system, comprising:
a system architecture that includes:
  a first horizontal layer including a plurality of access interfaces, each access interface adapted to receive a problem report from a customer, wherein the problem report indicates that the customer is having a problem with a network-based service of a plurality of network-based services;
  a task management domain at the first horizontal layer and adapted to:
    obtain a workflow from a second horizontal layer of the problem management system;
    provide a diagnostic tool from the second layer to the customer via the access interface, according to the workflow; and
    an agent support platform to provide at least one of the diagnostic tool, a trouble report associated with the customer, and a problem history associated with the customer, to an agent via another access interface after the customer contacts the agent.

14. The problem management system of claim 13, wherein the task management domain is adapted to obtain information from a third horizontal layer to verify customer access to a problem management service before providing the diagnostic tool to the customer.

15. The problem management system of claim 13, wherein the first horizontal layer includes a customer tracking domain to store a customer trouble report, the trouble report including data indicating what has previously been done to resolve the problem, wherein the trouble report is accessible to the agent after the customer contacts the agent.

16. The problem management system of claim 13, wherein the first horizontal layer includes a common knowledge domain accessible to at least one of the agent and the customer, wherein the common knowledge domain stores data indicating how a problem previously reported by another customer was resolved.

17. The problem management system of claim 13, wherein the second horizontal layer includes, a problem handling domain to store customer problem and repair records, including at least one of complete problem resolution cases, problem histories related to a network, problem histories related to a service, customer contact logs, and problem outcomes.

18. The problem management system of claim 13, wherein the second horizontal layer includes at least one of a reporting domain to compile reports related to problem trends, alerts, service and network performance indicators, and agent performance indicators.

19. The problem management system of claim 13, wherein the access interface includes at least one of a web interface, an interactive voice response interface, an e-mail interface, a messaging interface, and a self-service television channel delivered to the customer via a private access network.

20. The problem management system of claim 13, wherein the other access interface includes a thin client graphical user interface.

* * * * *